Oct. 20, 1953  J. A. SCHWARZ  2,656,163
MIXER BOWL
Filed Sept. 19, 1951
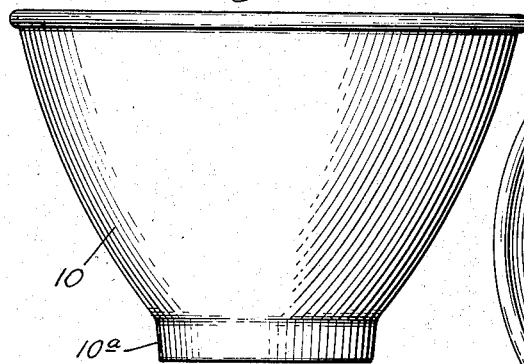
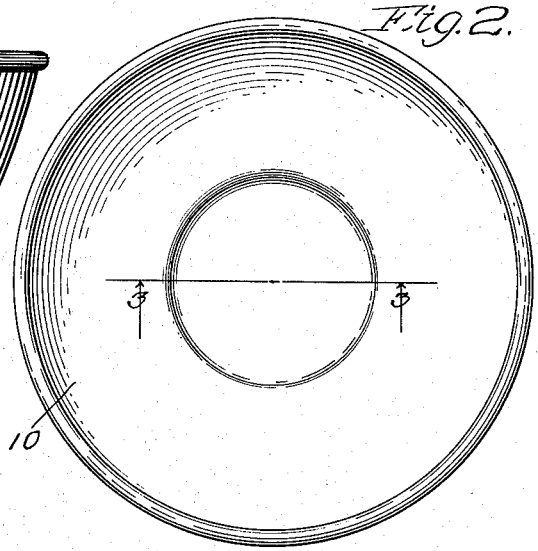
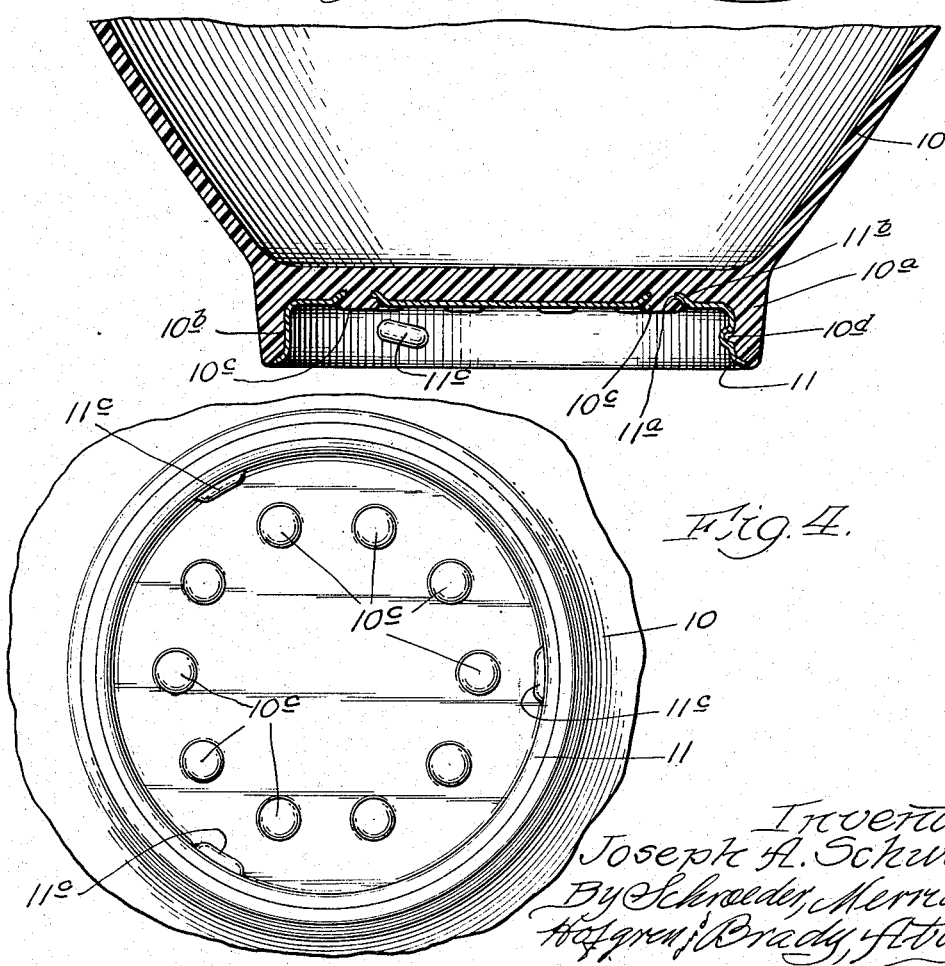
Inventor:
Joseph A. Schwarz,
By Schroeder, Merriam,
Hofgren & Brady, Attys.

UNITED STATES PATENT OFFICE 2,656,163

MIXER BOWL

Joseph A. Schwarz, Chicago, Ill., assignor to Birtman Electric Company, a corporation of Illinois Application September 19, 1951, Serial No. 247,317

5 Claims. (Cl. 259—81)

This invention relates to a mixer bowl and particularly to a bowl adapted to be used with a household type electric food mixer.

In the ordinary household type food mixer which employs one or more beaters driven by an electric motor the mixing bowl is removably attached to a base member of the mixer during the mixing operation. Ordinarily a locking device is provided on the base of the bowl so that the bowl may be removably locked to a rotatable platform or other supporting element in the base of the mixer.

Most of the mixer bowls now being used are constructed of a relatively fragile material such as molded plastic, glass or the like. These bowls have a neat appearance and are easy to clean and are also inert to the acids and other ingredients in the foods. The principal difficulty with these bowls has been, however, that the base portion which carries the attaching means for removably attaching the bowl to the mixer base frequently breaks because of the strain imposed thereon. As the bowl is fastened at its base, this base portion concentrates the forces exerted on the bowl during the mixing operation and this concentration of forces causes the breakage.

In solving the above problem of preventing easy breakage in the relatively fragile base portion of the mixer bowl, applicant provides a rigid attachment member fastened to the base portion at a plurality of spaced areas each of substantial size and means on this rigid member for removably attaching this member and thus the bowl to the mixer platform member on which the bowl is intended to be mounted. With this arrangement, the rigid attachment member takes the concentrated strains and as it is quite strong, preferably being made of metal, it does not break. The forces acting between the relatively fragile base portion of the bowl and the attachment member are divided over a large area by spacing the areas of attachment and making them of substantial size.

The invention will be described as shown in the accompanying drawings. Of the drawings: Fig. 1 is a side elevation of a mixer bowl adapted to be removably attached to a platform member on a household mixer and embodying the invention; Fig. 2 is a plan view of the bowl of Fig. 1; Fig. 3 is a fragmentary vertical section taken substantially along line 3—3 of Fig. 2; and Fig. 4 is a fragmentary elevational view taken from the bottom of the bowl shown in Figs. 1 to 3.

The mixer bowl 10 of this invention has at least the base portion thereof constructed of a relatively fragile material such as glass, molded synthetic plastic and the like. This mixer bowl is adapted to be removably attached to a mixer platform member in the customary manner. Such a mixer platform member is shown and described, for example, in my copending application Serial No. 260,634, filed December 8, 1951.

In order to prevent or substantially reduce the danger of breakage in the base portion of the bowl, this base portion 10a is provided with a rigid attachment member 11 fastened to the base portion at a plurality of spaced areas each of substantial size. The rigid attachment member 11 also is provided with means for attaching this member and thus the bowl to the platform member.

In the embodiment shown in the drawings the base portion 10a of the bowl is provided with a concave bottom depression 10b opening downwardly as shown most clearly in Fig. 3. The rigid attachment member 11 is in the form of an inverted cup-shaped member preferably of metal held in this depression 10b with the outer surface of the metal member bearing against the inner surface of the depression-containing base portion. This inverted metal cup is attached to the base portion 10a at a plurality of spaced areas. As is shown, the attachment member 11 is provided with a plurality of openings 11a each bounded by upwardly extending marginal areas 11b. The base portion 10a of the bowl is firmly attached to the member 11 by portions 10c of the base extending through the openings 11a. These extending portions 10c have flattened heads bearing against the end surfaces of the surrounding areas 11b. As shown, there are ten openings 11a and ten corresponding extending portions 10c. As can be seen, the material of the base portion 10a, which is preferably a molded plastic material, surrounds and clamps the raised annular shoulders 11b on both the top and bottom surfaces thereof so that the areas of fastening are of substantial size.

In order to lock the bowl on a mixer platform a screw type locking means is employed. In the embodiment shown this locking means is in the form of spaced inclined inward projections 11c all inclined at the same angle and in the same direction with respect to the inner circumference of the member 11. These projections 11c are in the form of inwardly extending hollow projections formed in the metal attachment member 11. Corresponding portions of the base portion 10a of the bowl extend into these projections, as indicated at 10d, and aid further in locking the member 11 in the bowl base and in increasing the area of attachment to reduce the stress per unit area on the bowl base portion.

Having described my invention as related to the embodiment shown in the accompanying drawings, it is my intention that the invention be not limited by any of the details of description unless otherwise specified but rather be construed broadly within its spirit and scope as set out in the accompanying claims.

I claim:

1. In a mixer bowl adapted to be removably attached to a mixer platform member, a base portion on the bowl having a concave bottom depression, a metal member of inverted cup shape held in said depression with the outer surface of the metal member bearing against the inner surface of the depression-containing base portion and attached thereto at a plurality of spaced areas each of substantial size, and means on the metal member for removably attaching this member to the platform member.

2. The mixer bowl of claim 1 wherein the bowl base portion is a molded plastic material and the areas of attachment include openings in the metal member into which this molded material extends.

3. The mixer bowl of claim 1 wherein the attaching means on the metal member includes spaced inwardly-extending hollow projections at the sides thereof into which corresponding parts of the bowl base portion extends, said projections serving to aid in attaching the base portion to the metal member.

4. A mixer bowl adapted to be removably attached to a mixer platform member, comprising: a relatively fragile base portion on the bowl, a rigid tough attachment member positioned within a bottom recess in this fragile base portion, the attachment member being provided with a plurality of spaced openings into which portions of the fragile material extend, and means on the attachment member for removably attaching this member and thus the bowl to the platform member.

5. A mixer bowl adapted to be removably attached to a mixer platform member, comprising: a relatively fragile base portion on the bowl, a rigid tough attachment member snugly interfitted against a large area of the bottom of said base portion to make intimate contact therewith, the fragile material of the base portion being attached to the attachment member at a plurality of spaced small areas extending around said large area and on substantially all sides thereof, and means on the attachment member for removably attaching this member and thus the bowl to the platform member.

JOSEPH A. SCHWARZ.

References Cited in the file of this patent

UNITED STATES PATENTS

| Number | Name | Date |
| --- | --- | --- |
| 565,371 | Stadelman | Aug. 4, 1896 |
| 1,733,291 | Aastrup | Oct. 29, 1929 |
| 1,839,082 | Burgard | Dec. 29, 1931 |

FOREIGN PATENTS

| Number | Country | Date |
| --- | --- | --- |
| 22,223 | Great Britain | Sept. 24, 1910 |
| 201,689 | Great Britain | Aug. 9, 1923 |